United States Patent
Van Der Linden et al.

(10) Patent No.: US 8,150,818 B2
(45) Date of Patent: Apr. 3, 2012

(54) METHOD AND SYSTEM FOR STORING STRUCTURED DOCUMENTS IN THEIR NATIVE FORMAT IN A DATABASE

(75) Inventors: Robbert C. Van Der Linden, Scotts Valley, CA (US); Brian S. Vickery, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 2294 days.

(21) Appl. No.: 10/648,760

(22) Filed: Aug. 25, 2003

(65) Prior Publication Data
US 2005/0050059 A1    Mar. 3, 2005

(51) Int. Cl.
*G06F 7/00* (2006.01)
*G06F 17/30* (2006.01)

(52) U.S. Cl. .................................................. 707/705
(58) Field of Classification Search .................. 707/100
See application file for complete search history.

(56) References Cited

U.S. PATENT DOCUMENTS

| | | |
|---|---|---|
| 4,907,151 A | 3/1990 | Bartlett |
| 5,193,184 A | 3/1993 | Belsan et al. |
| 5,283,830 A | 2/1994 | Hinsley et al. |
| 5,412,807 A | 5/1995 | Moreland |
| 5,561,786 A | 10/1996 | Morse |
| 5,644,776 A | 7/1997 | DeRose et al. |
| 5,652,858 A | 7/1997 | Okada et al. |
| 5,671,403 A | 9/1997 | Shekita et al. |
| 5,673,334 A * | 9/1997 | Nichani et al. ............... 382/143 |
| 5,758,361 A * | 5/1998 | van Hoff ..................... 715/513 |
| 5,787,449 A | 7/1998 | Vulpe et al. |
| 5,878,415 A | 3/1999 | Olds |
| 5,893,086 A | 4/1999 | Schmuck et al. |
| 5,920,861 A | 7/1999 | Hall et al. |
| 5,995,952 A | 11/1999 | Kato |
| 6,044,373 A | 3/2000 | Gladney et al. |
| 6,081,810 A | 6/2000 | Rosenzweig et al. |
| 6,085,193 A | 7/2000 | Malkin et al. |
| 6,101,558 A | 8/2000 | Utsunomiya et al. |
| 6,236,996 B1 | 5/2001 | Bapat et al. |
| 6,237,099 B1 | 5/2001 | Kurokawa |
| 6,249,844 B1 | 6/2001 | Schloss et al. |

(Continued)

FOREIGN PATENT DOCUMENTS

EP    0992873    4/2000

(Continued)

OTHER PUBLICATIONS

You-Chin Fuh et al., "Annotated Automation Encoding of XML Schema for High Performance Schema Validation;" Filed Apr. 16, 2003, U.S. Appl. No. 10/418,658, pp. 1-61.

(Continued)

*Primary Examiner* — Tim T Vo
*Assistant Examiner* — Garrett Smith
(74) *Attorney, Agent, or Firm* — Sawyer Law Group, P.C.

(57) ABSTRACT

A method, computer readable medium, and system for storing a structured document in its native format in a database are provided. The method, computer readable medium, and system include receiving the structured document, generating a hierarchical node tree comprising a plurality of nodes, where the node tree represents the structured document, and storing the plurality of nodes in at least one record in the database.

30 Claims, 9 Drawing Sheets

U.S. PATENT DOCUMENTS

| | | |
|---|---|---|
| 6,308,173 B1 | 10/2001 | Glasser et al. |
| 6,334,130 B1 | 12/2001 | Tada et al. |
| 6,336,114 B1 | 1/2002 | Garrison |
| 6,366,934 B1 | 4/2002 | Cheng et al. .................. 707/513 |
| 6,381,602 B1 | 4/2002 | Shoroff et al. |
| 6,421,656 B1 | 7/2002 | Cheng et al. ....................... 707/2 |
| 6,438,576 B1 | 8/2002 | Huang et al. |
| 6,457,103 B1 | 9/2002 | Challenger et al. |
| 6,480,865 B1 | 11/2002 | Lee et al. ....................... 707/523 |
| 6,487,566 B1 | 11/2002 | Sundaresan ................... 707/513 |
| 6,502,101 B1 | 12/2002 | Verprauskus et al. ......... 707/101 |
| 6,519,597 B1 | 2/2003 | Cheng et al. ...................... 707/10 |
| 6,584,458 B1 | 6/2003 | Millett et al. |
| 6,631,371 B1 | 10/2003 | Lei et al. |
| 6,658,652 B1 * | 12/2003 | Alexander et al. ............. 717/128 |
| 6,798,776 B1 | 9/2004 | Cheriton et al. |
| 6,820,082 B1 | 11/2004 | Cook et al. |
| 6,836,778 B2 | 12/2004 | Manikutty et al. |
| 6,853,992 B2 | 2/2005 | Igata |
| 6,901,410 B2 | 5/2005 | Marron et al. |
| 6,922,695 B2 | 7/2005 | Skufca et al. |
| 6,938,204 B1 * | 8/2005 | Hind et al. ..................... 715/515 |
| 6,947,945 B1 | 9/2005 | Carey et al. |
| 6,959,416 B2 * | 10/2005 | Manning et al. .............. 715/513 |
| 7,016,915 B2 | 3/2006 | Shanmugasundaram et al. |
| 7,031,962 B2 | 4/2006 | Moses |
| 7,043,487 B2 | 5/2006 | Krishnamurthy et al. |
| 7,353,222 B2 | 4/2008 | Dodds et al. |
| 7,478,337 B2 | 1/2009 | Kodosky et al. |
| 7,493,603 B2 | 2/2009 | Fuh et al. |
| 7,756,857 B2 | 7/2010 | Wan |
| 7,818,666 B2 | 10/2010 | Dorsett, Jr. et al. |
| 2001/0018697 A1 * | 8/2001 | Kunitake et al. ............... 707/517 |
| 2002/0038319 A1 * | 3/2002 | Yahagi ........................... 707/513 |
| 2002/0099715 A1 | 7/2002 | Jahnke et al. ................. 707/100 |
| 2002/0103829 A1 | 8/2002 | Manning et al. .............. 707/513 |
| 2002/0111965 A1 | 8/2002 | Kutter ............................ 707/513 |
| 2002/0112224 A1 | 8/2002 | Cox ............................... 717/124 |
| 2002/0123993 A1 | 9/2002 | Chau et al. ......................... 707/5 |
| 2002/0133484 A1 | 9/2002 | Chau et al. ......................... 707/3 |
| 2002/0156772 A1 | 10/2002 | Chau et al. ......................... 707/3 |
| 2002/0156811 A1 * | 10/2002 | Krupa ............................ 707/513 |
| 2002/0169788 A1 | 11/2002 | Lee et al. ....................... 707/104 |
| 2003/0014397 A1 | 1/2003 | Chau et al. ......................... 707/3 |
| 2003/0028495 A1 | 2/2003 | Pallante |
| 2003/0204515 A1 | 10/2003 | Shadmon et al. |
| 2003/0208490 A1 | 11/2003 | Larrea et al. |
| 2004/0044959 A1 | 3/2004 | Shanmugasundaram et al. |
| 2004/0128615 A1 | 7/2004 | Carmel et al. |
| 2004/0193607 A1 | 9/2004 | Kudo et al. |
| 2004/0243553 A1 | 12/2004 | Bailey |

FOREIGN PATENT DOCUMENTS

| | | |
|---|---|---|
| WO | WO 03/030031 | 4/2003 |

OTHER PUBLICATIONS

Kanne, Carl-Christian et al., "Efficient Storage of XML Data," Universität Mannheim, Germany, Jun. 16, 1999. pp. 1-20.

"Using an XML Query Language to Publish Relational Data as XML," Dossier—ARC919990247, pp. 1-37.

"Annotated Automation Encoding of XML Schema for High Performance Schema Validation," Dossier—SVL920020102, pp. 1-61.

Chilimbi, Trishui M. et al., "Cache-Conscious Structure Layout," ACM 1999, pp. 1-12.

Park, Sangwon et al., "XML Query Processing Using Signature and DTD," E-Commerce and Web Technologies, Sep. 2-6, 2002, pp. 162-171.

Park, Sangwon et al., "A New Query Processing Technique for XML Based on Signature," IEEE Apr. 18-21, 2001, pp. 22-29.

Park, Sangwon et al., "SigDAQ: an Enhanced XML Query Optimization Technique," the Journal of Systems and Software, No. 61, No. 2, Mar. 15, 2002, pp. 91-103.

Roth, Amir, et al., "Dependence Based Prefetching for Linked Data Structures," ACM 1998, pp. 115-126.

Shuf, Yefim, et al., "Creating and Preserving Locality of Java Applications at Allocation and Garbage Collection Times," ACM 2002, pp. 13-25.

Yang, Siuxi et al., "Speeding Up the Memory Hierarchy in Flat Coma Multiprocessors," IEEE, Feb. 1-5, 1997, pp. 4-13.

E. Damiani, S. De Capitani Di Vimercati, S. Paraboschi, P. Samarati, "Design and implementation of an access control processor for XML documents". Computer Networks 22 (2000) pp. 59-75. Published Jun. 2000.

E. Damiani, S. De Capitani Di Vimercati, S. Paraboschi, P. Samarati, "A Fine-Grained Access Control System for XML Documents". ACM Transactions on Information and System Security, vol. 5, No. 2, pp. 169-202. Published May 2002.

Masatoshi Yoshikawa et al., "Xrel: a Path-Based Approach to Storage and Retrieval of XML Documents Using Relation Databases," Japan, ACM 2001.

Lin Guo et al., "XRANK: Ranked Keyword Search over XML Documents," ACM, SIGMOD 2003, Jun. 9-12, 2003, San Diego, CA.

V. Christophides et al., "Querying Structured Documents with Hypertext Links using OODBMS," France, ACM 1998.

* cited by examiner

METHOD AND SYSTEM FOR STORING STRUCTURED DOCUMENTS IN THEIR NATIVE FORMAT IN A DATABASE

FIELD OF THE INVENTION

The present invention relates generally to computer implemented database systems and, more particularly, to a method and system for storing structured documents in their native format in a database system.

BACKGROUND OF THE INVENTION

Structured documents are documents which have nested structures. Documents written in Extensible Markup Language (XML) are structured documents. XML is quickly becoming the standard format for delivering information on the World Wide Web because it allows the user to design a customized markup language for many classes of structure documents. XML supports user-defined tabs for better description of nested document structures and associated semantics, and encourages separation of document contents from browser presentation.

As more and more businesses present and exchange data in XML documents, the challenge is to store, search, and retrieve these documents using existing relational database systems. A relational database management system (RDBMS) is a database management system which uses relational techniques for storing and retrieving data. Relational databases are organized into tables, which consist of rows and columns of data. A database will typically have many tables and each table will typically have multiple rows and columns. The tables are typically stored on direct access storage devices (DASD), such as magnetic or optical disk drives for semi-permanent storage.

Some relational database systems store an XML document as a BLOB (Binary Large Objects) or map the XML data to rows and columns in one or more relational tables. Both of these approaches, however, have serious disadvantages. First, an XML document that is stored as a BLOB must be read and parsed before it can be queried, thereby making querying costly and time consuming. Second, the mapping process is burdensome and inefficient, especially for large XML documents, because mapping XML data to a relational database can result in a large number of columns with null values (which wastes space) or a large number of tables (which is inefficient). Furthermore, by storing an XML document in a relational database, the nested structure of the document is not preserved. Thus, parent-child(ren) relationships are difficult to reconstruct.

Accordingly, a need exists for an improved method and system for storing structured documents in their native formats within a database system. The method and system should be integrated (or capable of being integrated) with an existing database system in order to use the existing resources of the database system. The present invention addresses such a need.

SUMMARY OF THE INVENTION

The present invention is directed to an improved method and system for storing structured documents in their native format in a database system. The method comprises receiving the structured document, generating a hierarchical node tree comprising a plurality of nodes, wherein the node tree represents the structured document, and storing the plurality of nodes in at least one record in the database.

Through the aspects of the present invention, a structured document is parsed and a hierarchical node tree comprising a plurality of nodes is generated from the parsed data. The plurality of nodes is stored in one or more records. Each node points to its parent, to its attributes, and to its child-elements. By storing the structured document as a plurality of nodes forming a node tree, the document's structure is preserved and navigation up and down the tree is simplified. Moreover, by storing the nodes of the tree in standard database records, the existing infrastructure for fixed page buffer management, utilities, and operations, e.g., logging, locking and replication, can be utilized.

DETAILED DESCRIPTION

The present invention relates generally to computer implemented database systems and, more particularly, to an improved method and system for storing structured documents in their native format in a database system. The following description is presented to enable one of ordinary skill in the art to make and use the invention and is provided in the context of a patent application and its requirements. Various modifications to the preferred embodiment and the generic principles and features described herein will be readily apparent to those skilled in the art. For example, the following discussion is presented in the context of a DB2® database environment available from IBM® Corporation. It should be understood that the present invention is not limited to DB2 and may be implemented with other relational database systems or with other native XML database systems. Thus, the present invention is to be accorded the widest scope consistent with the principles and features described herein.

According to a preferred embodiment of the present invention, an XML document is parsed and a hierarchical node tree comprising a plurality of nodes is generated from the parsed data. The plurality of nodes is stored in one or more records, which in turn are stored on one or more pages. Each node points to its parent, to its attributes, and to its child-elements. Storing the XML document as a hierarchical node tree comprising a plurality of nodes preserves the document's structure and simplifies navigation up and down the tree. Moreover, by storing the nodes of the tree in standard database records, the existing infrastructure for fixed page buffer management, utilities, and operations, e.g., logging, locking and replication, can be utilized.

Figure 1:
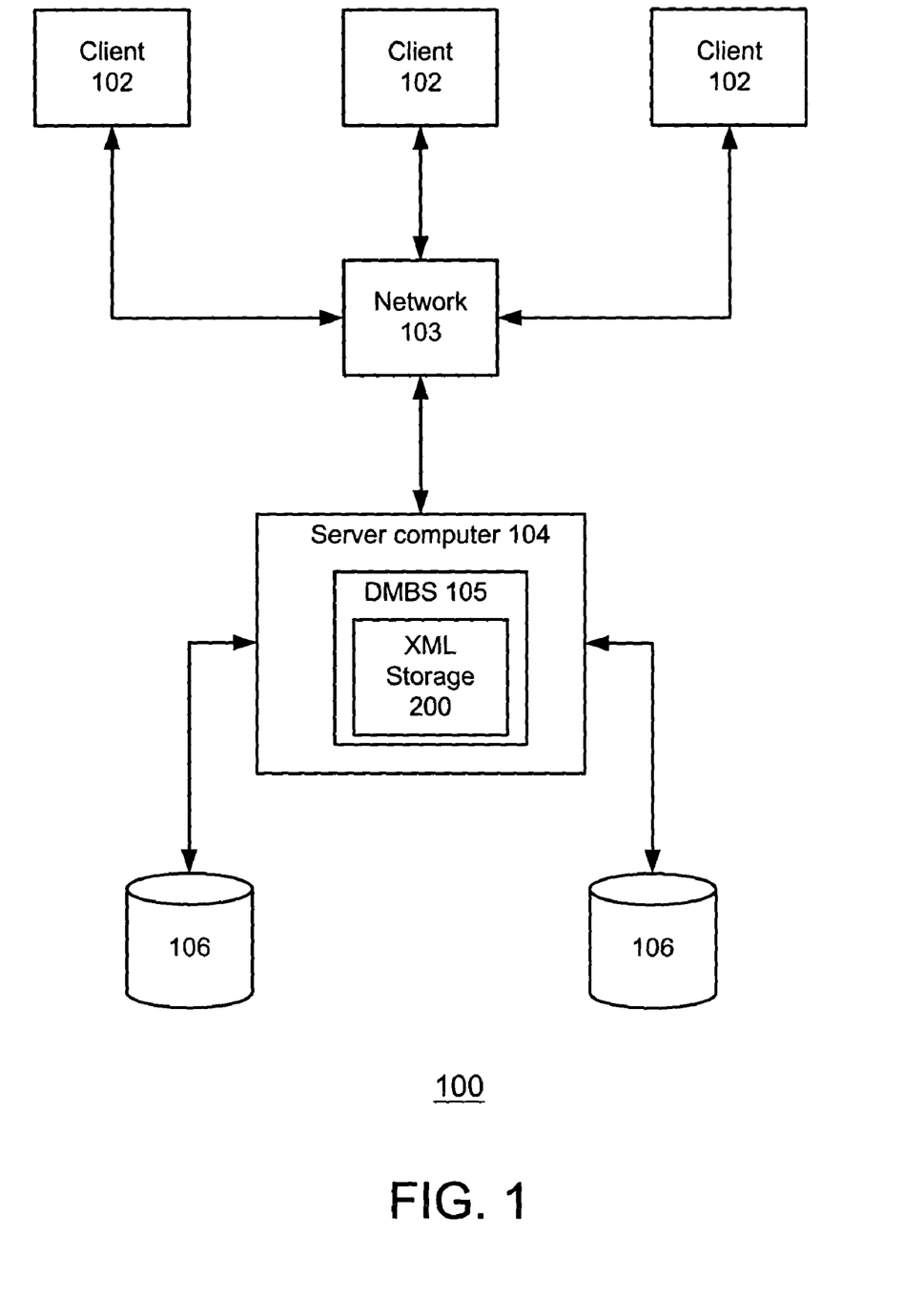
FIG. 1 is a block diagram of an exemplary computer hardware environment for use with the present invention.

To describe further the present invention, please refer to FIG. 1, which is an exemplary computer hardware environment for use with the present invention. In FIG. 1, a typical distributed computer system utilizes a network 103 to connect client computers 102 executing client applications to a server computer 104 executing software and other computer programs, and to connect the server computer 104 to data sources 106. These systems are coupled to one another by various networks, including LANs, WANs, and the Internet. Each client computer 102 and the server computer 104 additionally comprise an operating system and one or more computer programs (not shown).

The server computer 104 uses a data store interface (not shown) for connecting to the data sources 106. The data store interface may be connected to a database management system (DBMS) 105, which supports access to the data store 106. The DBMS 105 can be a relational database management system (RDBMS), such as the DB2® system developed by IBM Corporation, or it also can be a native XML database system. The interface and DBMS 105 may be located at the server computer 104 or may be located on one or more separate machines. The data sources 106 may be geographically distributed.

The DBMS 105 and the instructions derived therefrom are all comprised of instructions which, when read and executed by the server computer 104 cause the server computer 104 to perform the steps necessary to implement and/or use the present invention. While the preferred embodiment of the present invention is implemented in the DB2® product offered by IBM Corporation, those skilled in the art will recognize that the present invention has application to any DBMS, whether or not the DBMS 105 is relational or native. Moreover, those skilled in the art will recognize that the exemplary environment illustrated in FIG. 1 is not intended to limit the present invention, and that alternative environments may be used without departing from the scope of the present invention.

Figure 2:
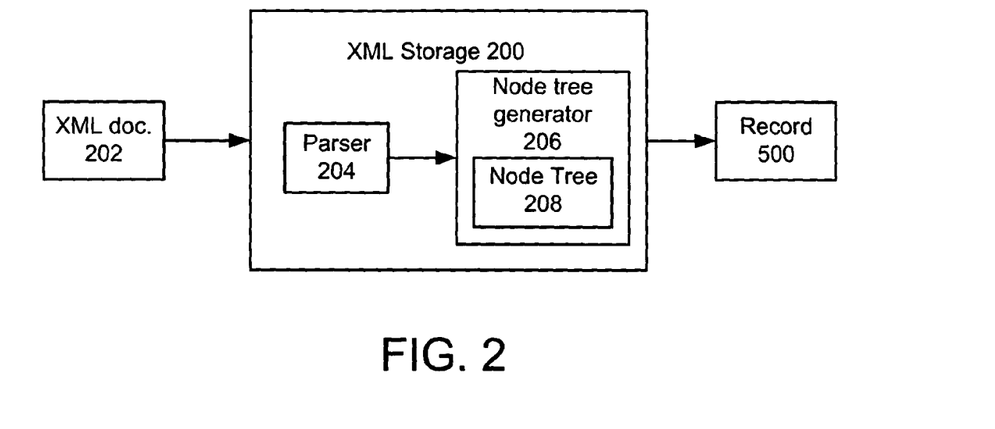
FIG. 2 is a block diagram of the XML Storage mechanism according to the preferred embodiment of the present invention.

According to the preferred embodiment of the present invention, the DBMS 105 includes an XML Storage mechanism 200 that supports the storage of XML documents in their native format on disk. Storing data "on disk" refers to storing data persistently, for example, in the data store 106. FIG. 2 is a block diagram of the XML Storage mechanism 200 according to the preferred embodiment of the present invention. The XML Storage mechanism 200 comprises a parser 204 and a node tree generator 206. Each component will be described in further detail in conjunction with FIG. 3.

Figure 3:
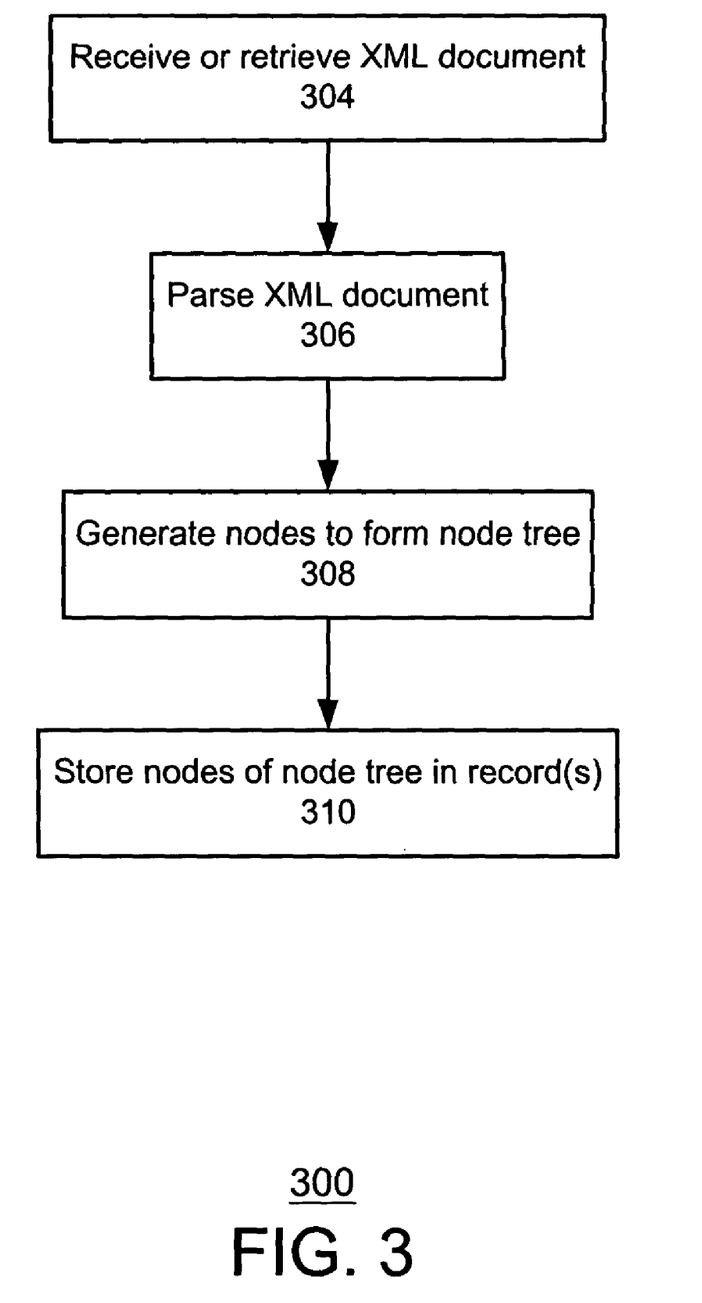
FIG. 3 is a high level flowchart illustrating a process for storing XML documents in their native format in a database according to a preferred embodiment of the present invention.

FIG. 3 is a flowchart illustrating a method 300 for storing XML documents in their native format in a database according to a preferred embodiment of the present invention. In step 304, the XML Storage mechanism 200 receives or retrieves an XML document 202 for storage, in step 304. The XML document 202 is parsed by the parser 204, (e.g., a standard SAX (Simple API for XML) parser), in step 306. Next, in step 308, the node generator 206 takes the parsed XML data and generates a plurality of nodes that form a hierarchical node tree 208 that represents the XML document. In one preferred embodiment, the hierarchical node tree 208 is a DOM (Direct Object Model) tree.

According to the preferred embodiment of the present invention, the node tree 208 preserves the hierarchical structure of the XML document 202 and also preserves the document order, i.e., the order of the nodes. The plurality of nodes forming the node tree 208 is stored in an XML Record 500 in step 310, and each record 500 is, in turn, stored on a page. The XML Record 500 is similar to a standard database record that stores relational data except that the XML Record 500 stores XML data. Storing the plurality of nodes in a record 500 is advantageous because a record 500, like an XML document, is variable in length. Records also can be re-directed, providing a layer of indirection that insulates pointers into a tree, from e.g., within the tree itself, from indices, or from an anchor table (described below), if the record is moved to a different page. Moreover, the infrastructure for fixed page buffer management, recovery, utilities (backup/restore), logging, locking, and replication can be reused.

Figure 4:
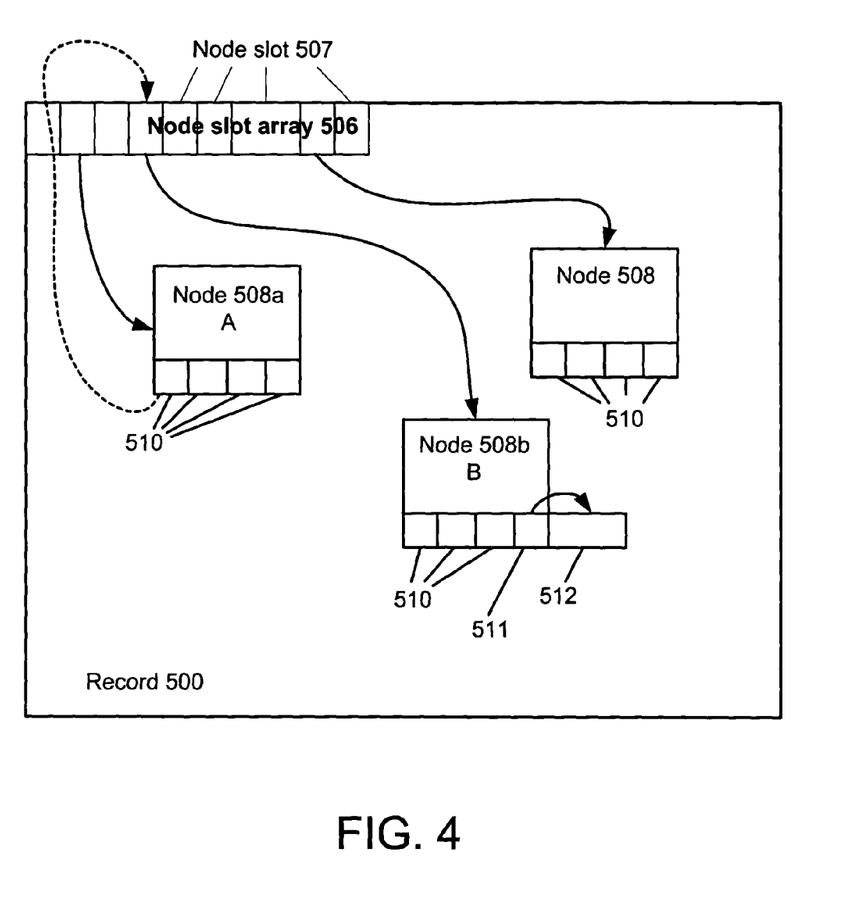
FIG. 4 is a block diagram of an XML Record according to a preferred embodiment of the present invention.

To explain further the details of the present invention, please refer to FIG. 4, which is a block diagram of an XML Record 500 according to a preferred embodiment of the present invention. As is shown, the XML Record 500 comprises a node slot array 506 and a plurality of nodes 508a, 508b, 508 representing at least one XML document 202. Each entry in a node slot 507 points to a node, e.g., 508, in the node tree 208 and provides the following advantages:

- a layer of indirection insulates the pointers into the tree from nodes moving to a different XML Record 500 or page
- a convenient place to find the pointers that might need updating during certain utility functions, e.g., online reorganization, or during in-memory operations on temporary documents where pointers might be replaced with real in-memory pointers
- an inventory of all nodes 508 in an XML Record 500 and of all nodes 508 referenced by nodes 508 in the XML Record 500.

As is shown, each node 508, 508a, 508b comprises an array of child pointers 510. Each child pointer 510 generally points to a node slot 507, which in turn, points to a node, e.g., 508b, corresponding to the child. Thus, for example, in FIG. 4, Node B 508b is the child node of Node A 508a. Child pointers 510 can be small because they only need to point to a node slot 507. In certain circumstances a child pointer, e.g., 511, will point to an in-lined character array 512 in the same node, e.g., 508b. The in-lined character array 512 contains information describing the child. In other circumstances, the child pointer 510 itself will comprise information describing the child and its value. The information in the child pointer 510 will be more fully described below.

Figure 5:
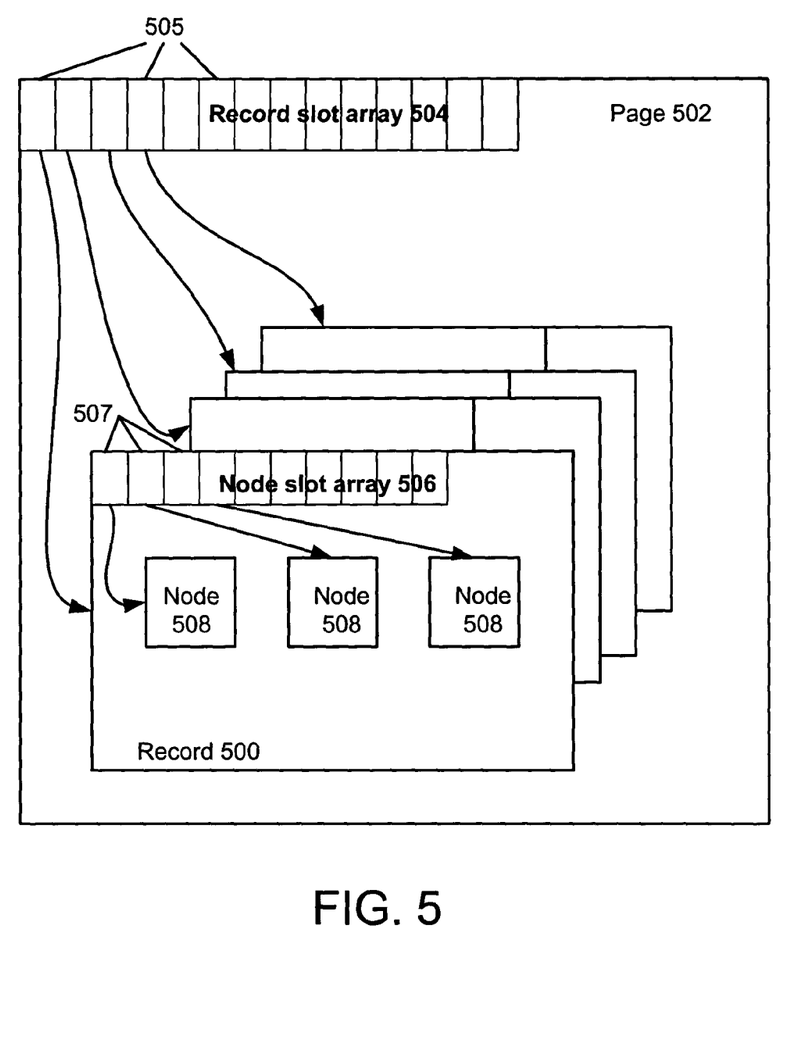
FIG. 5 is a block diagram of a page comprising at least one XML Record according to the preferred embodiment of the present invention.

FIG. 5 is a block diagram of a page 502 comprising at least one XML Record 500 according to the preferred embodiment of the present invention. The page 502 includes a record slot array 504 whereby each record slot array entry 505 points to an XML Record 500. According to a preferred embodiment of the present invention, each node 508 in an XML Record 500 on a page 502 is identified by an XID. The XID is a physical identification of the node 508 in an XML document 202. In one preferred embodiment, the XID comprises a record slot number 505, which points to the XML Record 500, and a node slot number 507, which points to the node 508. In other embodiments, the XID can include a portion of the physical location details of the node 508 where there is an assumed context. Consequently, an XID can be an abstraction of a "node reference," and the node reference itself is implemented differently depending on the circumstances.

A node tree 208 representing an XML document 202 is identified by a root node 508, which is the topmost node 508 in the node tree 208. All other nodes 508 in the node tree 208 are children or descendants of the root node 508. The XID of the root node 508 is referred to as a rootID, and comprises the record slot number 505 pointing to the XML Record 500 and the node slot number 507 pointing to the root node 508.

Figure 6:
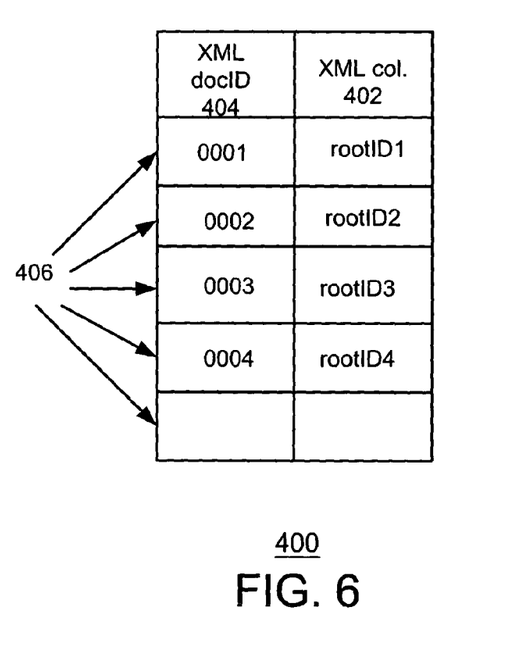
FIG. 6 illustrates an exemplary anchor table according to the preferred embodiment of the present invention.

In another preferred embodiment where the DBMS 105 is a relational database management system, the rootID is stored in an anchor table. FIG. 6 illustrates an exemplary anchor table 400 according to the preferred embodiment of the present invention. The anchor table 400 serves as a reference point that "anchors" an XML document 202 within a relational database environment. Each row 406 anchors one XML document 202. As is shown, the anchor table 400 is essentially a relational table comprising an XML Type column 402 and an XML document identifier column 404. The rootID is stored in the XML Type column 402 of the anchor table 400 along with an identifier for the associated XML document 202. Those skilled in the art will recognize that the anchor table 400 is but one way to anchor XML documents 202 within a database system. In a database system other than a relational database system, other formats may be more suitable.

Figure 7A:
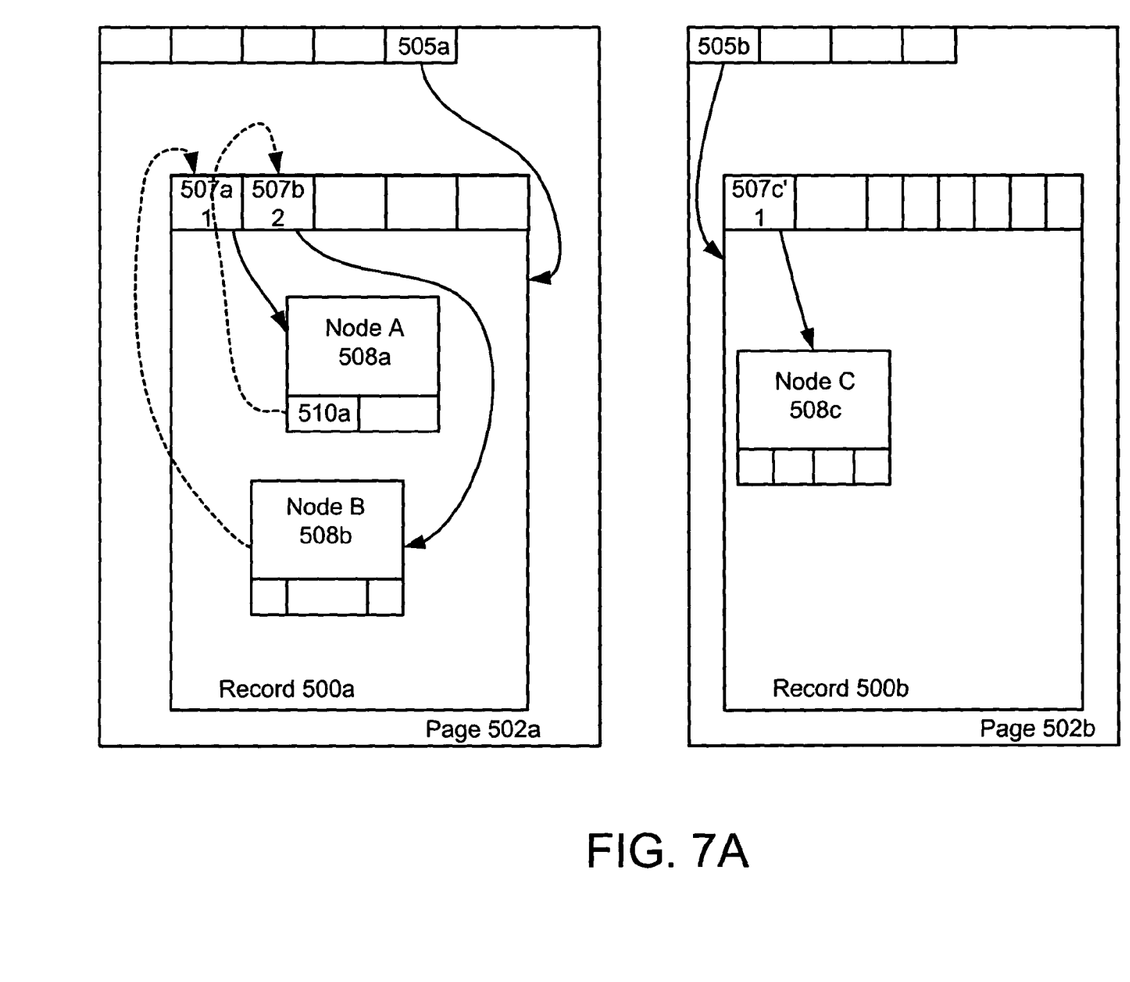
FIGS. 7A-7C illustrate two pages containing two XML Records according to a preferred embodiment of the present invention.

Referring again to FIG. 5, the plurality of nodes forming the node tree 208 representing an XML document 202 preferably fits within one XML Record 500 on a page 502. Nevertheless, if the plurality of nodes of the node tree 208 do not fit in one XML Record 500, the plurality of nodes 508 are distributed over a plurality of XML Records 500 on one or more pages 502. To describe how this is accomplished, please refer to FIGS. 7A-7B, which illustrate two pages 502a and 502b containing two XML Records 500a and 500b according to a preferred embodiment of the present invention. As is shown, the entry in the record slot array 505a points to XML Record 500a. While XML Record 500a is illustrated as containing two nodes 508a, 508b, those skilled in the art readily appreciate that the XML Record 500a is not limited to two nodes and can actually include one or more than two nodes. The entry in node slot 1 (507a) points to Node A (508a). Node A (508a) has at least two children, one of which is Node B (508b). Child pointer 510a points to node slot 2 (507b), which in turn points to Node B (508b). Each node (e.g., 508b) also points to its parent node (e.g., 508a). Thus, because Node B (508b) is the child node of Node A (508a), Node B (508b) points to node slot 1 (507a), which points to Node A (508a).

Figure 7B:
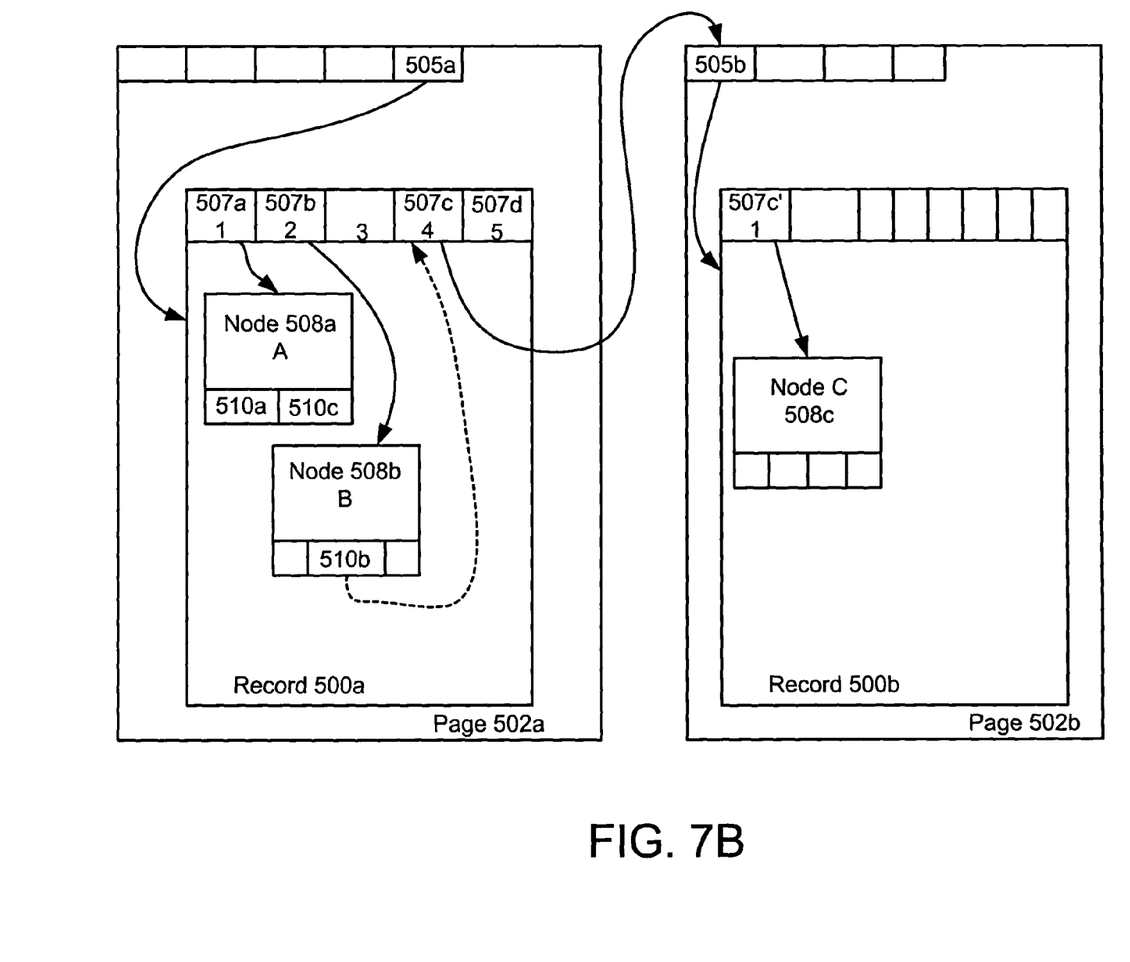

Referring now to FIG. 7B, Node B (508b) has at least three children. Child pointer 510b points to node slot 4 (507c) whose entry points to a node, e.g., 508c, in a different XML Record 500b on a different page 502b. Thus, the entry in node slot 4 (507c) points to record slot 505b on page 502b, which in turn points to XML Record 500b. The entry also points to node slot number 1 (507c') in XML Record 500b, which then points to Node C (508c).

As is described above, a node slot entry (e.g., 507b) can point to a node (e.g., 508b) that resides within the XML Record 500a, or to a node (e.g., 508c) that resides in a different XML Record 500b. Accordingly, node slot entries (507) are large because they need to be able to point to nodes (508c) in other XML Records 500b in addition to pointing to nodes (508a, 508b) in the local XML Record 500a. In a preferred embodiment, the entry (e.g., 507a) pointing to a local node (e.g., 508a) is an offset, while the entry (e.g., 507c) pointing to a node (e.g., 508c) in another XML Record 500b is the node's XID. Thus, for example, the entry in node slot 4 (507c) is the XID of Node C, that is, Node C's record slot number and the node slot number.

In the above described example, Nodes A, B and C (508a, 508b, 508c) were distributed over a plurality of XML Records (500a, 500b). In another embodiment, child pointers, e.g., 510a, 510c, of one node, 508a, can be distributed over a plurality of nodes in the same or different XML Records (500a, 500b). This is necessary if the number of child pointers (510a, 510c) for a node (508a) do not fit in the node (508a).

Figure 7C:
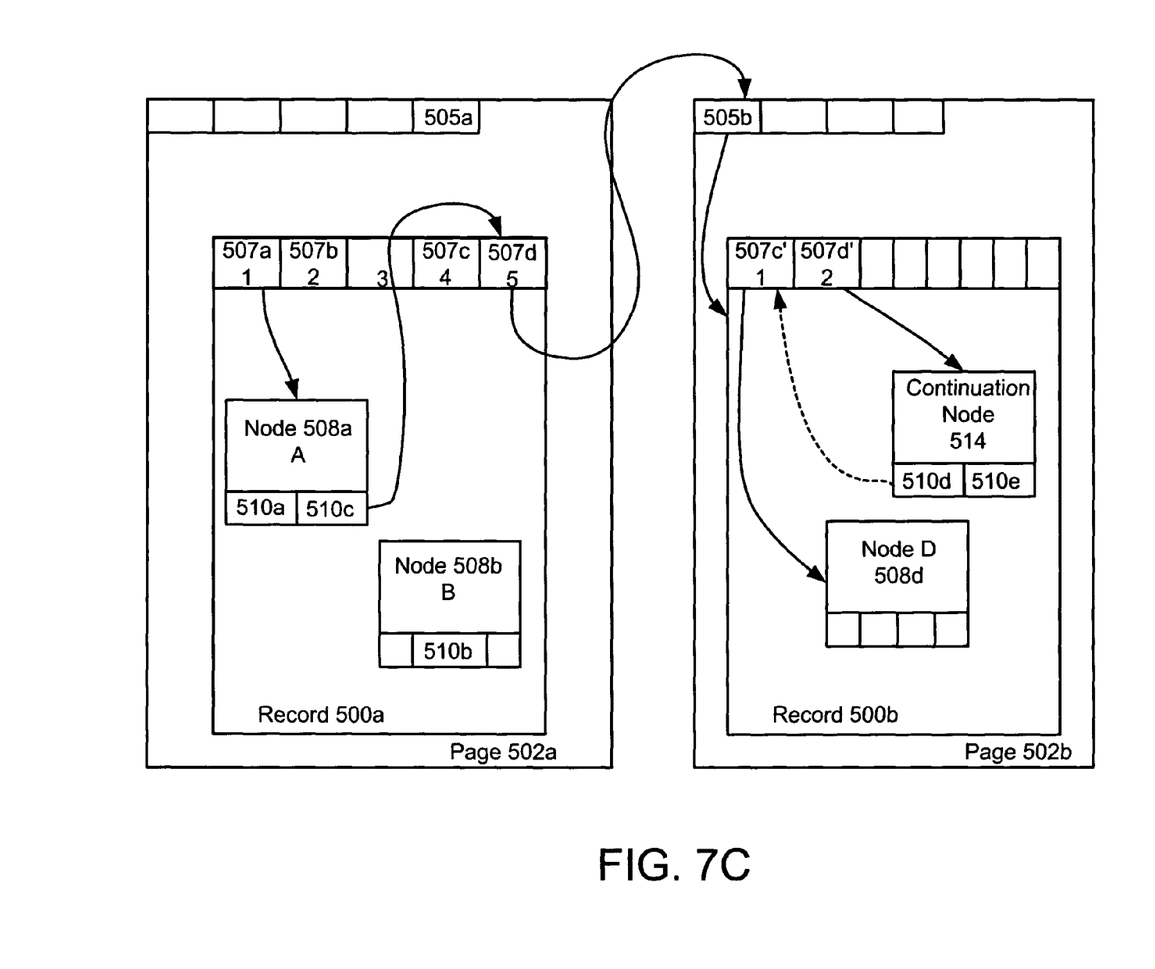

Referring now to FIG. 7C, one or more child pointers (510c) in a node 508a (referred to as a parent node) point to a continuation node 514, which can reside in the same XML Record (500a) or in a different XML Record 500b. In this instance, the continuation node 514 resides in a different XML Record 500b than that containing the parent node 508a. The continuation node 514 continues the array of child pointers 510d, 510e of the parent node 508a. Thus, the node 508a can have an unlimited number of children (510a, 510c, 510d, 510e) across multiple nodes in the same or different XML Records 500a, 500b on multiple pages 502a, 502b.

For example, referring again to FIG. 7C, assume the child pointers (510a, 510c) of Node A (508a) do not fit in Node A (508a). As is shown, child pointer 510c points to node slot number 5 (507d). Because the entry to node slot number 5 (507d) points to a node (e.g., 514) in a second XML Record 500b on a second page 502b, the entry (507d) is preferably the node's XID. Accordingly, the entry (507d) includes a pointer pointing to the record slot 505b on the second page 502b, which in turn points to the second XML Record 500b, as well as a pointer pointing to node slot number 2 (507d') in the second XML Record 500b, which then points to the continuation node 514. Each child pointer 510d, 510e of the continuation node 514 points to a node slot, e.g., child pointer 510d points to node slot 1 (507c'), whose entry points to a node, e.g., Node D (508d). Node D (508d) is a child of Node A (508a).

Figure 8:
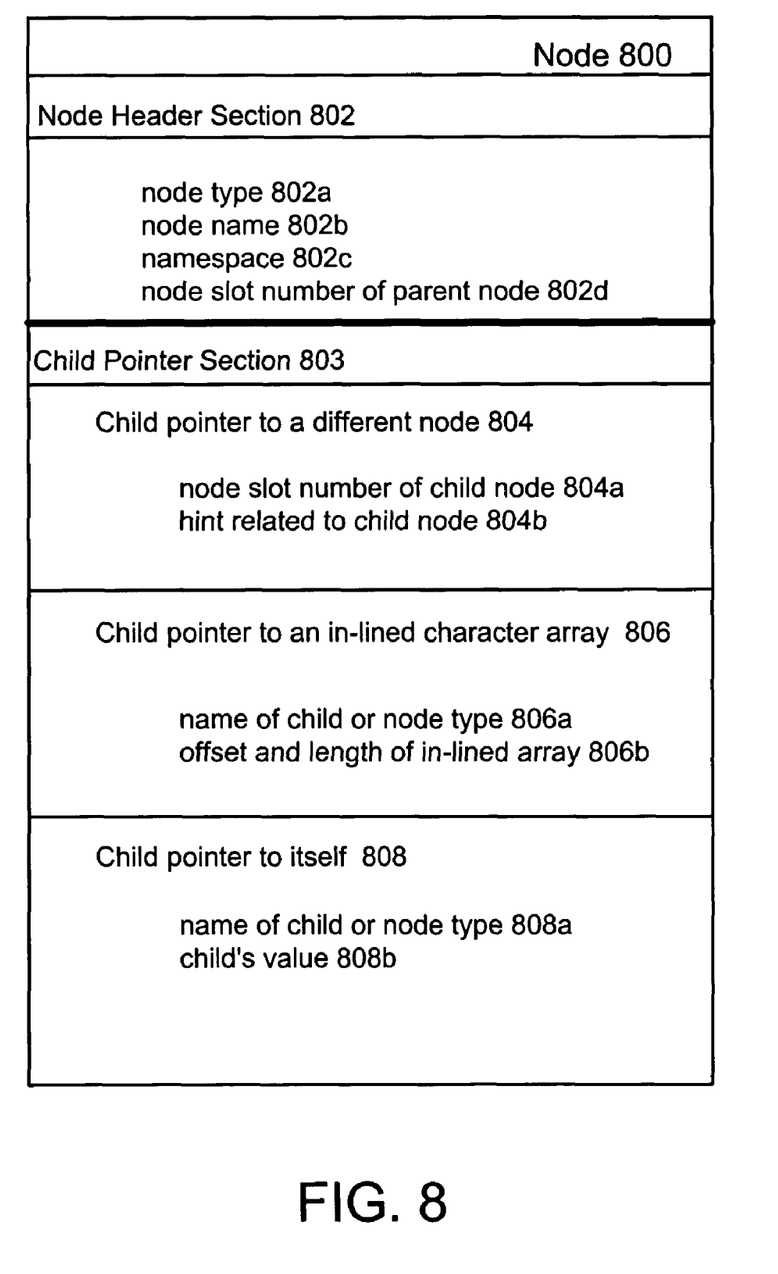
FIG. 8 is a block diagram of a node according to a preferred embodiment of the present invention.

The structure and contents of the node 508 will now be described with reference to FIG. 8, which is a block diagram of a node 800 according to a preferred embodiment of the present invention. The node 800 is generally divided into two sections, a node header section 802 and a child pointer section 803. The node header section 802 comprises:

The node type 802a
The name of the node 802b
The namespace of this node 802c
Node slot number of the parent node 802d The node type (802a) identifies what the node 508 represents in the XML document 202. The node type (802a) is typically an element, attribute, processing instruction or text node, although those skilled in the art recognize that other less common node types exist. The node name (802b) is typically the element or attribute name, or processing instruction target. The namespace of the node (802c) is the namespace of the element or attribute. The node slot number of the parent node (802d) allows the node 508 to identify its parent node for navigation purposes.

The child pointer section 803 comprises one of at least three formats. According to a preferred embodiment of the present invention, there are at least three classes of children:

The first class is an "ordered" child. Ordered children are children whose order is important pursuant to the XML standard. Ordered children include elements, text, processing instructions and comments type nodes. In addition, proprietary type nodes, e.g., continuation nodes 514, are considered ordered children.

The second class is an "attribute" child. Attribute type nodes are not ordered.

The third class is an "internal" child. An internal child is used to store additional information about the parent node, such as a namespace prefix of the node.

In the array of child pointers 510 of the node 508, the order in which children are stored in the node is: "internal" children first, followed by "attribute" children second, and then "ordered" children. This ordering is based on the presumption that the number of internal children is far fewer than the number of attribute children, which in turn is far fewer than the number of ordered children. Thus, child pointers 510 pointing to internal and attribute children will typically be in the main parent node 508, as opposed to a continuation node 514.

Referring again to FIG. 8, the format for a child pointer 510 depends on where the child node resides, e.g., in a separate node (508b) or in the parent node (508a). The first format (804) applies when the child pointer, e.g., 510a, points to an ordered, attribute, or internal child in a different node (e.g., 508b). Generally, the node type of such a child will be of an element or attribute type. In this case, the child node (508b) is a node itself. Such a child pointer 510a includes:

The node slot number of the child node (804a)

A hint related to the child node (804b)

In a preferred embodiment, a hint related to the child node (804c) is stored in the child pointer 510a itself to facilitate navigation during query evaluation. As those skilled in the art are aware, when an XML document 202 is stored in its native format in a database, query evaluation typically involves navigating the nodes 508 of the XML document 202 to find values that satisfy a query. While the cost (resources and time) of navigating between nodes 508 in the same XML Record 500 is relatively inexpensive, the cost of navigating between nodes 508 in different XML Records 500 on different pages 502 is substantial.

By storing the hint (804c) in the child pointer 510a, the DBMS 105 can decide whether to invest resources to visit the child node (508b) based on the hint. In a preferred embodiment, the hint is a portion of the child node's name because the name is typically descriptive of the node 508. Thus, if the DBMS 105 is navigating the node tree 208 in search of element or attribute name "abcde" and is positioned on a node (e,g, 508a) with 50 child pointers 510, the DBMS 105 will iterate over each of the child pointers 510 looking for a child pointer 510 that stores a hint that matches or partially matches the name "abcde." If the hint in a particular child pointer 510 does not match or partially match, the DBMS 105 will not follow the pointer 510 to the child. If the hint matches or partially matches, there is a likelihood that the child to which the child pointer 510 is pointing is of interest, and the DBMS 105 will follow the pointer 510 to the node 508 and perform a full name and namespace check. Accordingly, instead of navigating over the entire node tree, the DBMS 105 is able to prune branches of no interest and to navigate only to those children that match or partially match the query.

Referring again to FIG. 8 and the different formats for the child pointer 510, the second format (806) applies when the child pointer 510 points to an ordered, attribute or internal child in an in-lined character array 512 in the node (e.g., 508b). Here, the child is part of its parent node. The child pointer 510 fully describes the child, and comprises:

The name of the child node, or if it has no name, the type of the node (e.g., text) (806a)

The offset and length of the in-lined character array (806b)

The third format (808) is applied when the child pointer 510 itself fully describes the child and its value. In this case, the data in the "pointer" 510 comprises:

The name of the child node, or if it has no name, the type of the node (e.g., text) (808a)

The child's value (808b)

An improved method and system for storing a structured document in its native format in a database is disclosed. Through the aspects of the present invention, a structured document is parsed and a hierarchical node tree comprising a plurality of nodes is generated from the parsed data. The plurality of nodes is stored in one or more records. Each node points to its parent, to its attributes, and to its child-elements.

By storing the structured document as a plurality of nodes forming a node tree, the document's structure is preserved and navigation up and down the tree is simplified. Moreover, by storing the nodes of the tree in standard database records, the existing infrastructure for fixed page buffer management, utilities, and operations, e.g., logging, locking and replication, can be utilized.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for storing a structured document in its native format in a database, the method comprising:
   receiving a structured document;
   generating a hierarchical node tree comprising a plurality of nodes, wherein the node tree represents the structured document;
   storing the plurality of nodes in at least one record in the database, and
   storing the at least one record on at least one page, and
   wherein each record comprises a node slot array, the node slot array including a plurality of node slots, each node slot including a pointer pointing to one of the plurality of nodes in the hierarchical node tree, wherein each page comprises a plurality of record slots, wherein each record slot includes a pointer pointing to a record stored on the page.

2. The method of claim 1, wherein generating the hierarchical node tree further comprises:
   parsing the structured document into the plurality of nodes; and
   linking each of the plurality of nodes via pointers to form the hierarchical node tree.

3. The method of claim 1, wherein each node is identified by an identifier comprising a record slot number corresponding to the record slot pointing to the record in which the node resides and a node slot number corresponding to the note slot pointing to the node.

4. The method of claim 1, wherein a node comprises a plurality of child pointers if the node has children, wherein each of the plurality of pointers points to a child node.

5. The method of claim 4, wherein a child pointer points to a node slot pointing to the child node if the child node is a separate node.

6. The method of claim 5, wherein a node slot in a first record in a first page points to a record slot in a second page and a node slot in a second record if the child node is a separate node stored in the second record on the second page.

7. The method of claim 4, wherein the node further comprises an in-lined character array.

8. The method of claim 7, wherein a child pointer describes the child by pointing to the in-lined character array.

9. The method of claim 4, wherein a child pointer describes the child and its value.

10. The method of claim 1, wherein the structured document is written in Extensible Markup Language.

11. A computer readable medium encoded with a computer program for storing a structured document in its native format in a database, the computer program comprising instructions for:
   receiving a structured document;

generating a hierarchical node tree comprising a plurality of nodes, wherein the node tree represents the structured document;

storing the plurality of nodes in at least one record in the database, storing the at least one record on at least one page, and wherein each record comprises a node slot array, the node slot array including a plurality of node slots, each node slot including a pointer pointing to one of the plurality of nodes in the hierarchical node tree, wherein each page comprises a plurality of record slots, wherein each record slot includes a pointer pointing to a record stored on the page.

12. The computer readable medium of claim 11, wherein generating the hierarchical node tree further comprises:

parsing the structured document into the plurality of nodes; and linking each of the plurality of nodes via pointers to form the hierarchical node tree.

13. The computer readable medium of claim 11, wherein each node is identified by an identifier comprising a record slot number corresponding to the record slot pointing to the record in which the node resides and a node slot number corresponding to the note slot pointing to the node.

14. The computer readable medium of claim 11, wherein a node comprises a plurality of child pointers if the node has children, wherein each of the plurality of pointers points to a child node.

15. The computer readable medium of claim 14, wherein a child pointer points to a node slot pointing to the child node if the child node is a separate node.

16. The computer readable medium of claim 15, wherein a node slot in a first record in a first page points to a record slot in a second page and a node slot in a second record if the child node is a separate node stored in the second record on the second page.

17. The computer readable medium of claim 14, wherein the node further comprises an in-lined character array.

18. The computer readable medium of claim 17, wherein a child pointer describes the child by pointing to the in-lined character array.

19. The computer readable medium of claim 14, wherein a child pointer describes the child and its value.

20. The computer readable medium of claim 11, wherein the structured document is written in Extensible Markup Language.

21. A system for storing a structured document in its native format in a database, the system comprising:

a computer system coupled to at least one data storage device;

a database management system in the computer system;

a storage mechanism in the database management system for receiving a structured document, generating a hierarchical node tree comprising a plurality of nodes, wherein the node tree represents the structured document, and storing the plurality of nodes in at least one record in the at least one data storage device, wherein each page comprises a plurality of record slots, each of which includes a pointer pointing to a record stored on the page; wherein each record is stored on a page; and wherein each record comprises a node slot array, the node slot array including a plurality of node slots, each node slot including a pointer pointing to one of the plurality of nodes in the hierarchical node tree.

22. The system of claim 21, wherein the storage mechanism further comprises a parser for parsing the structured document into a plurality of nodes and a node tree generator for linking each of the plurality of nodes via pointers to form the hierarchical node tree.

23. The system of claim 21, wherein each node is identified by an identifier comprising a record slot number corresponding to the record slot pointing to the record in which the node resides and a node slot number corresponding to the note slot pointing to the node.

24. The system of claim 21, wherein a node comprises a plurality of child pointers if the node has children, wherein each of the plurality of pointers points to a child node.

25. The system of claim 24, wherein a child pointer points to a node slot pointing to the child node if the child node is a separate node.

26. The system of claim 24, wherein the node further comprises an in-lined character array.

27. The system of claim 26, wherein a child pointer fully describes the child by pointing to the in-lined character array.

28. The system of claim 21, wherein the structured document is written in Extensible Markup Language.

29. The system of claim 24, wherein a child pointer describes the child and its value.

30. The system of claim 25, wherein a node slot in a first record in a first page points to a record slot in a second page and a node slot in a second record if the child node is a separate node stored in the second record on the second page.

* * * * *